US008306786B1

(12) United States Patent
Lynch et al.

(10) Patent No.: US 8,306,786 B1
(45) Date of Patent: Nov. 6, 2012

(54) DETECTOR ARRAY FOR COMPRESSIVE SENSING

(75) Inventors: Jonathan J. Lynch, Oxnard, CA (US); Roy M. Matic, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 222 days.

(21) Appl. No.: 12/819,050

(22) Filed: Jun. 18, 2010

(51) Int. Cl.
*G01J 1/00* (2006.01)

(52) U.S. Cl. .................................... 702/189; 250/336.1

(58) Field of Classification Search .................. 702/189; 250/336.1, 370.08
See application file for complete search history.

(56) References Cited

U.S. PATENT DOCUMENTS 6,828,556 B2 * 12/2004 Pobanz et al. ............. 250/336.1
2009/0121145 A1 * 5/2009 Rostaing et al. ......... 250/370.08
2010/0264316 A1 * 10/2010 Delaney et al. ............ 250/358.1

OTHER PUBLICATIONS

James H. Schaffner, et al. "A Wideband Radiometer Module for an Unamplified Direct Detection Scalable W-band Imaging Array", *Proc. SPIE* vol. 6984, 694807 (2008).
M. F. Duarte, et al. "Single-Pizel Imaging via Compressive Sample", *IEEE Signal Processing Magazine*, vol. 25, No. 2, pp. 83-91 (2008).
Jonathan Lynch, Roy Matic, and Joshua Baron. "Performance Limitations of Compressive Sensing for Millimeter Wave Imaging", *Proc. SPIE 7670*, 7670D (2010).

* cited by examiner

*Primary Examiner* — Michael Nghiem
*Assistant Examiner* — Manuel Rivera Vargas
(74) *Attorney, Agent, or Firm* — Ladas & Parry

(57) ABSTRACT

A compressive sensor for sensing energy including a plurality of detectors for detecting a plurality of electromagnetic modes, wherein each detector has an output and detects at least one electromagnetic mode of the energy, a summer coupled to the plurality of detectors for forming a composite sum of the outputs of the plurality of detectors, and a plurality of switches, each respective switch coupled to a respective detector, wherein the respective switch may be switched to remove the respective detector from the composite sum.

17 Claims, 5 Drawing Sheets

DETECTOR ARRAY FOR COMPRESSIVE SENSING

TECHNICAL FIELD

This disclosure relates to imagers that utilize compressive sensing and in particular to millimeter wave or higher frequency imaging.

BACKGROUND

Millimeter wave imaging sensor arrays have been used to detect energy present in an imaging focal plane. These prior art sensor arrays produce images by directly sensing the energy in the focal plane, and each detector in the sensor array corresponds to one pixel in the image. Thus, sensitivity for these prior art sensors is limited by the noise at each sensor and by the amount of energy collected by each sensor. An example of such an array structure is disclosed in U.S. Pat. No. 6,828,556 to Pobanz et al. Another example of such an imaging sensor array is disclosed in "*A Wideband Radiometer Module for an Unamplified Direct Detection Scalable W-band Imaging Array*", by James H. Schaffner et al., *Proc. SPIE* Vol. 6948, 694807 (2008).

Compressive sampling, also known as compressive sensing and sparse sampling, is another prior art technique that has been used to sense energy in a scene. The key concept of compressive sampling is to exploit the structure and redundancy in an image. The advantage of compressive sampling is that a detector is not needed for each pixel to obtain a particular image resolution and thus this technique promises to be less expensive than requiring a detector in the sensor array corresponding to each pixel in the image.

Such a technique is described in "Single-Pixel Imaging via Compressive Sampling" by M. F. Duarte, et al., *IEEE Signal Processing Magazine*, Vol. 25, No. 2, pp. 83-91, 2008. The described device consists of a digital micromirror device, two lenses, a single photon detector, and an analog-to-digital (A/D) converter that computes pseudo-random linear measurements of the scene under view. The image is then recovered by processing the measurements with a digital computer. The technique utilizes spatial light modulators or mirrors to modulate the signals at the optical visible wavelengths.

The compressive sampling technique described by Duarte utilizes a single "pixel" to detect the combined signals from all of the modulators or mirrors. For the compressive sampling technique to work in typical situations with moderate to low signal-to-noise ratio (SNR), the single "pixel" must be able to detect a large number of electromagnetic modes so that the resulting signal power is larger than that for a single mode. EM modes are an orthogonal set of EM field patterns that describe the manner in which energy is radiated from or absorbed by an electrically active device, including antenna elements, antenna arrays, antenna-coupled detectors, and photodetectors. EM modes are further described in "*Performance Limitations of Compressive Sensing for Millimeter Wave Imaging*" by Jonathan Lynch, Roy Matic, and Joshua Baron, Proc. SPIE 7670, 7670D 2010, which is incorporated herein by reference as though set forth in full. Detecting a large number of electromagnetic modes is relatively easy to accomplish at visible wavelengths, because electrically large multi-mode detectors are common and convenient. However, millimeter wave detectors typically detect only a single mode, so employing the prior art single "pixel" technique of Duarte would result in a significant attenuation of the image and a poor signal to noise ratio, and thus poor image quality.

Research, such as described by Duarte, has focused on imaging at visible or infrared wavelengths and used moveable mirrors as the method to implement compressive sensing. At visible wavelengths, which are 1 micron or less, the movable mirrors used for single "pixel" compressive sampling generally have a size of about 50 wavelengths or about 50 microns, in order to achieve an electrically large multi-mode detector. Millimeter wavelengths are on the order of 3 millimeters, so a mirror size of 50 wavelengths would be 150 millimeters or about 5.9 inches in size, which makes this approach impractical for millimeter wave imaging.

What is needed is a device that provides detection of multiple independent modes to obtain a high signal to noise ratio and high sensed image quality for imaging sensors and in particular imaging sensors for millimeter wavelengths, while providing the benefits of compressive sensing. The embodiments of the present disclosure answer these and other needs.

SUMMARY

In a first embodiment disclosed herein, a compressive sensor for sensing energy comprises a plurality of detectors for detecting a plurality of electromagnetic modes, wherein each detector has an output and detects at least one electromagnetic mode of the energy, a summer coupled to the plurality of detectors for forming a composite sum of the outputs of the plurality of detectors, and a plurality of switches, each respective switch coupled to a respective detector, wherein the respective switch may be switched to remove the respective detector from the composite sum.

In another embodiment disclosed herein, a compressive sensor for sensing energy comprises a plurality of detectors for detecting a plurality of electromagnetic modes, wherein the plurality of detectors are connected serially, wherein each detector detects at least one electromagnetic mode of the energy and has an output, and wherein the outputs of the serially connected detectors form a composite sum; and a plurality of switches, each respective switch coupled to a respective detector, wherein the respective switch may be switched to remove an output of the respective detector from the composite sum.

In yet another embodiment disclosed herein, a method of compressive sensing of energy comprises summing outputs of a plurality of detectors to form a plurality of composite sums each composite sum corresponding to a switch state, wherein each detector detects at least one electromagnetic mode of the energy, wherein each respective detector has a respective switch for removing the respective detector from a composite sum, and wherein a switch state comprises a pattern of the plurality detectors not removed from a composite sum; and processing M composite sum measurements made for M different switch states, wherein M is less than N and the sensed energy is from an image having N pixel resolution.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
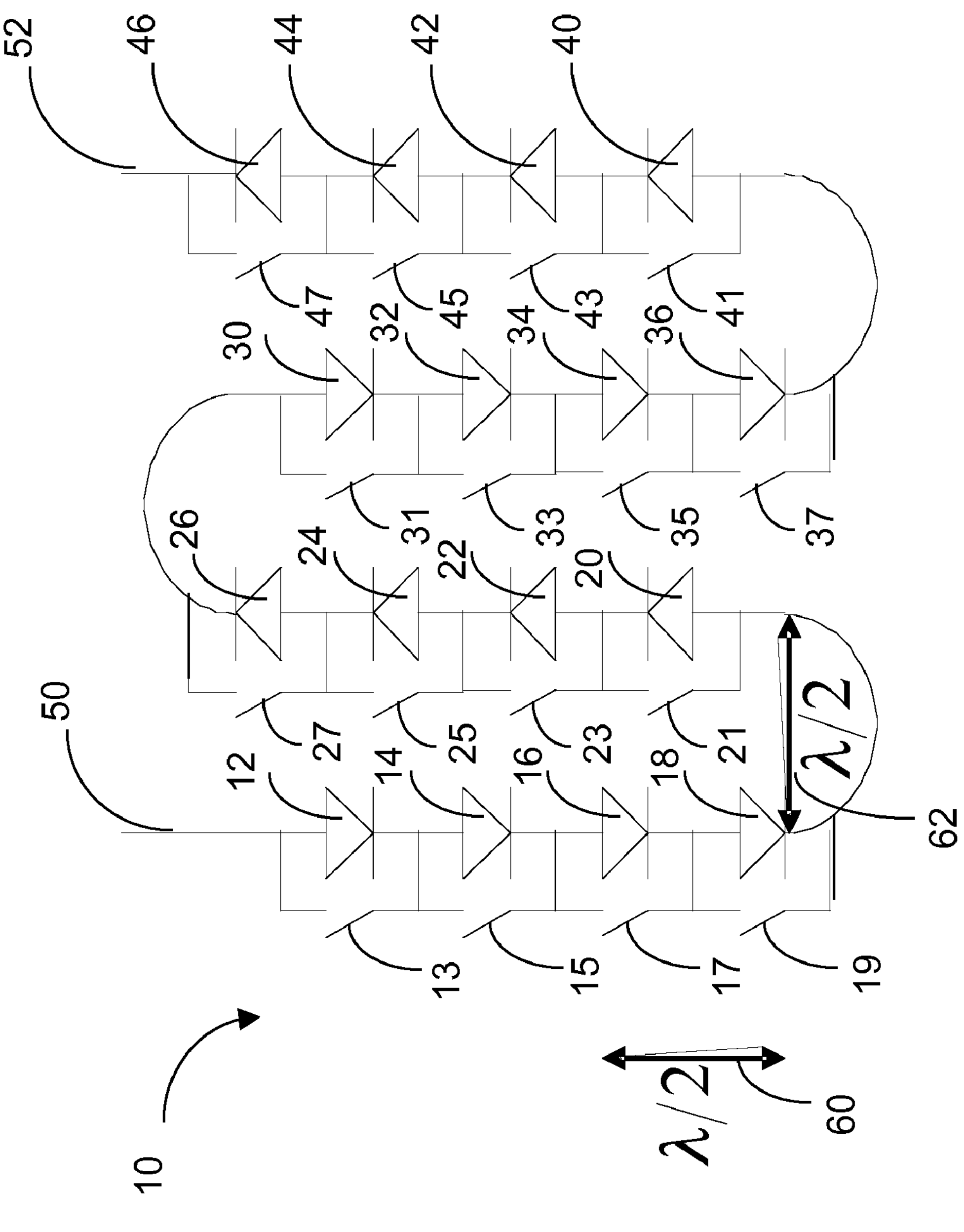
FIG. 1 shows a detector array for compressive sensing in accordance with the present disclosure.

Referring to FIG. 1, a detector array 10 is shown for compressive sensing in accordance with the present disclosure. The detector array 10 has an array of discrete detectors (12, 14, 16, 18, 20, 22, 24, 26, 30, 32, 34, 36, 40 42, 44, and 46) connected in series, each with a corresponding switch (13, 15, 17, 19, 21, 23, 25, 27, 31, 33, 35, 37, 41 43, 45, and 47, respectively) in parallel with the corresponding detector. When a switch corresponding to a detector is open, then the detector output is added to the other detectors in series. When a switch corresponding to a detector is closed, then the output of that detector is zeroed and does not contribute to the other detectors in series, effectively zeroing out the output of the detector having the closed switch.

For example, the detector 16 has a corresponding switch 17. The inputs to detector 16 and switch 17 are connected to the output of detector 14 and to switch 15. When switch 15 is open then the inputs to detector 16 and switch 17 are connected to the output of detector 14. When switch 15 is closed then the inputs to detector 16 and switch 17 are connected to the output of either detector 12 or switch 13, depending on whether switch 13 is opened or closed.

By closing some of the switches and opening other switches in the detector array 10, the detector array may be made to have multiple electromagnetic modes because different combinations of detectors with open switches in the detector array observe different radiation patterns. The outputs of the detectors in the detector array 10 that have their switches in an open position are summed in series providing a single composite output signal 52. As further described below, by collecting and processing composite output signals 52 with the switches in different combinations of open and closed, an image may be formed.

Figure 3:
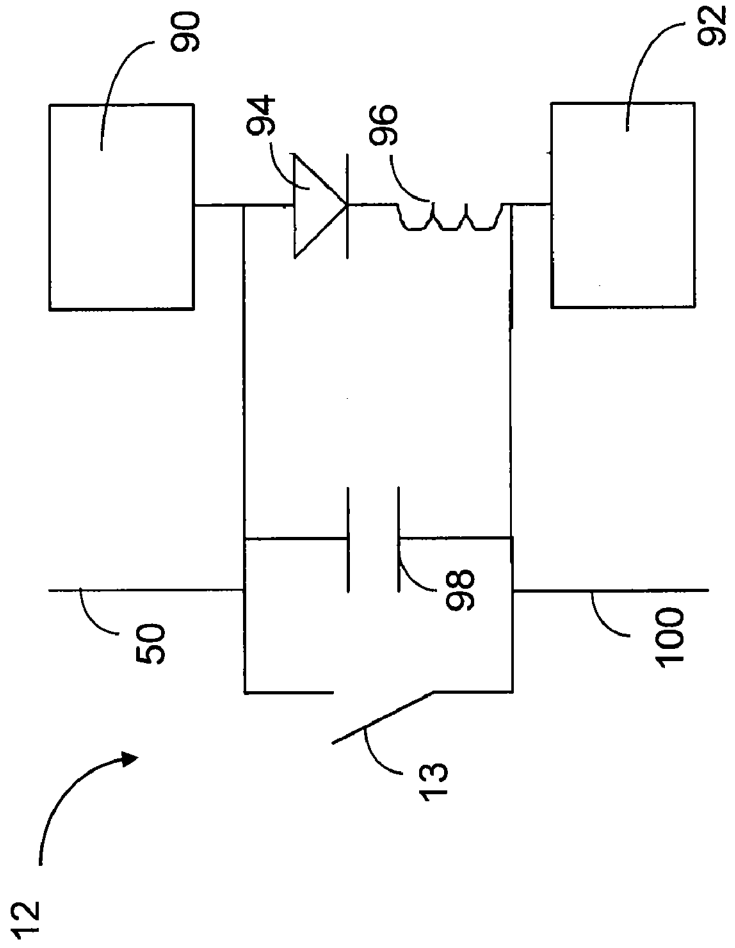
FIG. 3 shows a discrete detector in accordance with the present disclosure.
Figure 5:
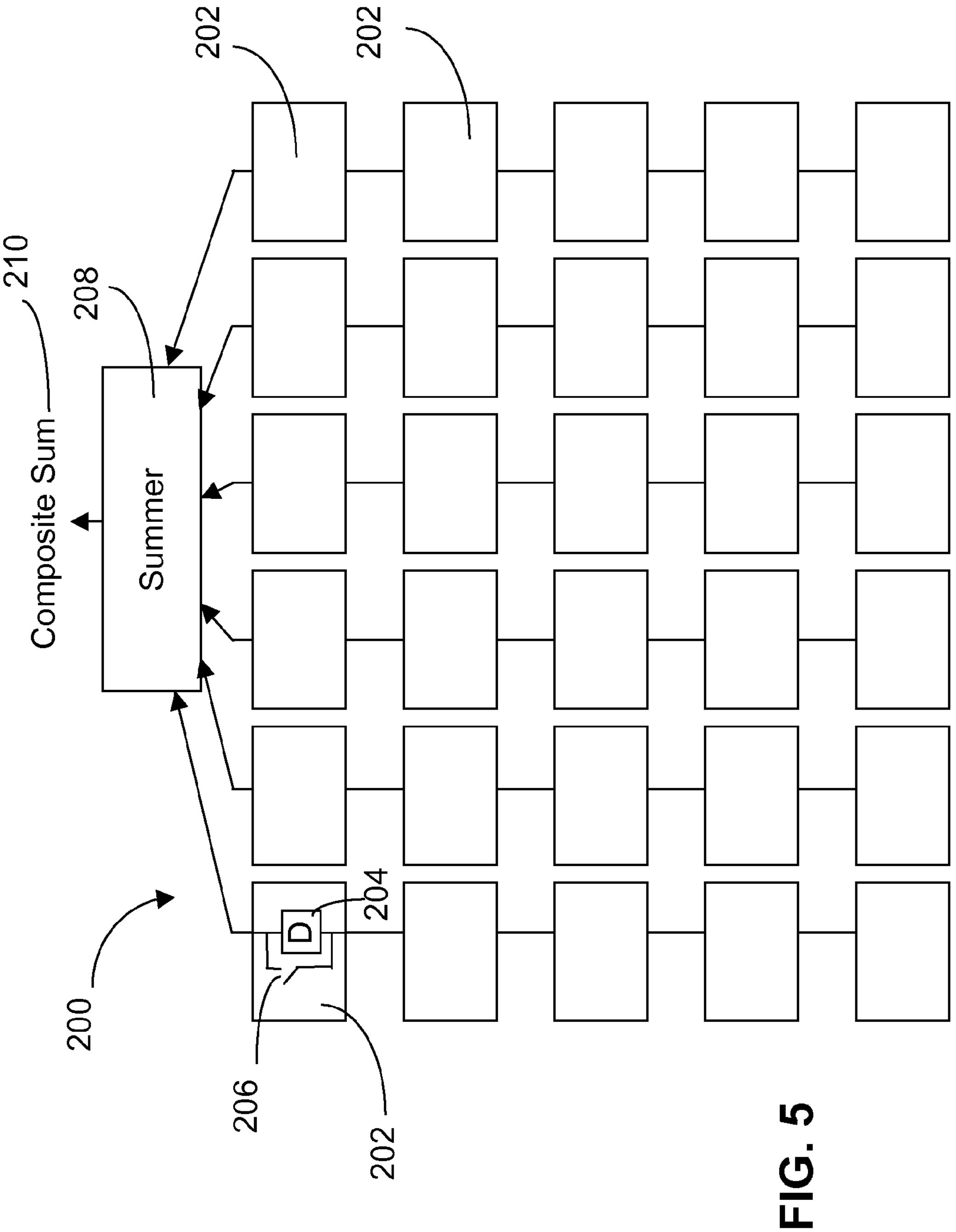
FIG. 5 shows another detector array for compressive sensing in accordance with the present disclosure.

FIG. 1 shows the detectors connected serially; however, another embodiment may connect each detector directly to a summer for forming the composite sum. Other configurations of the array are also possible, including a combination of groups of serially connected detectors whose outputs are connected to a summer. The detector array 200 shown in FIG. 5 shows such a configuration. Each detector 202 in the detector array 200 has a respective detector 204 and a respective switch 206, such as shown in FIG. 3. Outputs of groups of detectors 202 are summed by connecting them serially and then summing the output of each group with summer 208 to form a composite sum 210.

Figure 4:
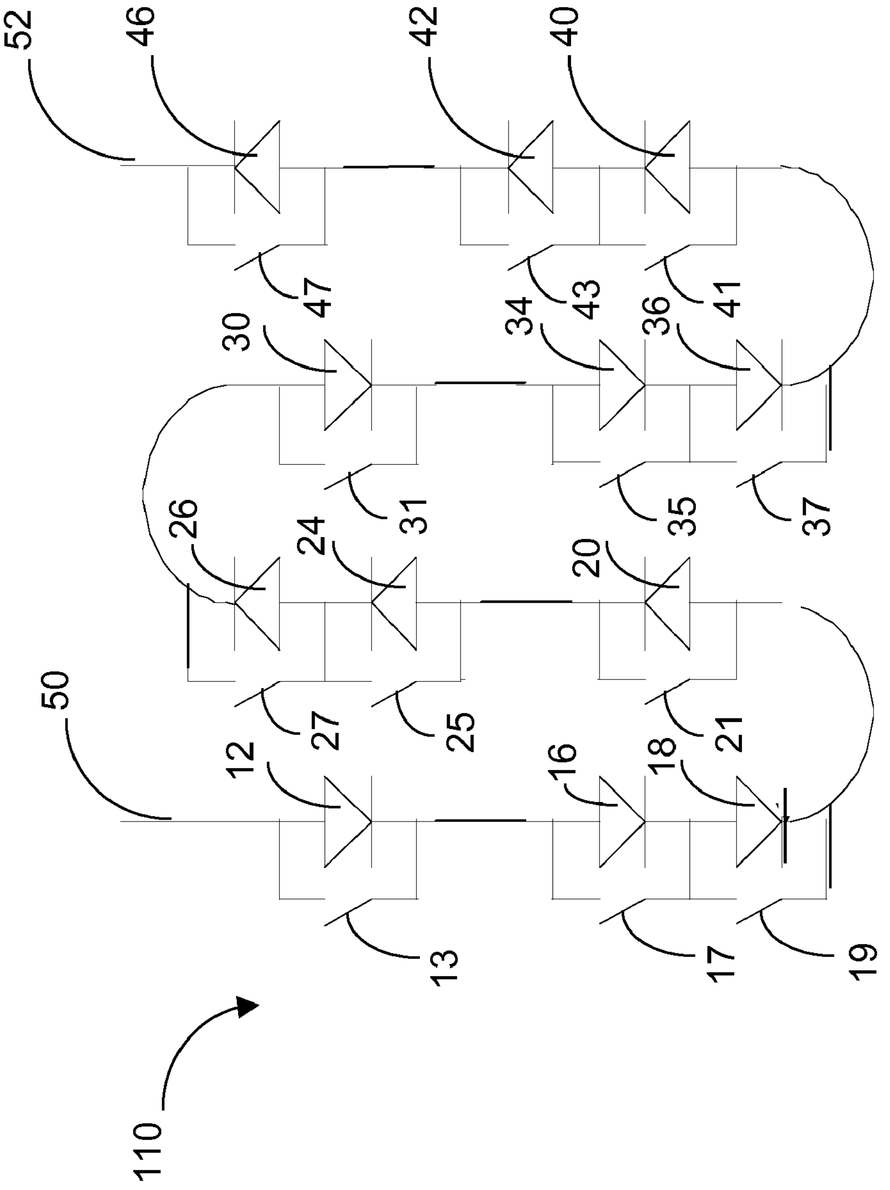
FIG. 4 shows another detector array for compressive sensing in accordance with the present disclosure.

The detectors in the detector array 10 may have horizontal and vertical spacings that correspond to the wavelengths (λ) of interest. Optical resolution is constrained by a diffraction limit that is approximately λ/2. Thus, there is little benefit to have the detectors on a horizontal and vertical spacing that is less than λ/2. However, the horizontal and vertical spacing of the detectors in the detector array 10 may be more than λ/2 and can be up to a maximum of 10λ. Also, as shown in FIG. 4, the detectors in the detector array need not be uniformly spaced. The detector array 110 in FIG. 4 is not uniformly spaced and not uniformly populated, or said another way, the detector array is sparsely populated. In one embodiment the arrangement of detector in the array may be randomly spaced and/or randomly populated.

Figure 2:
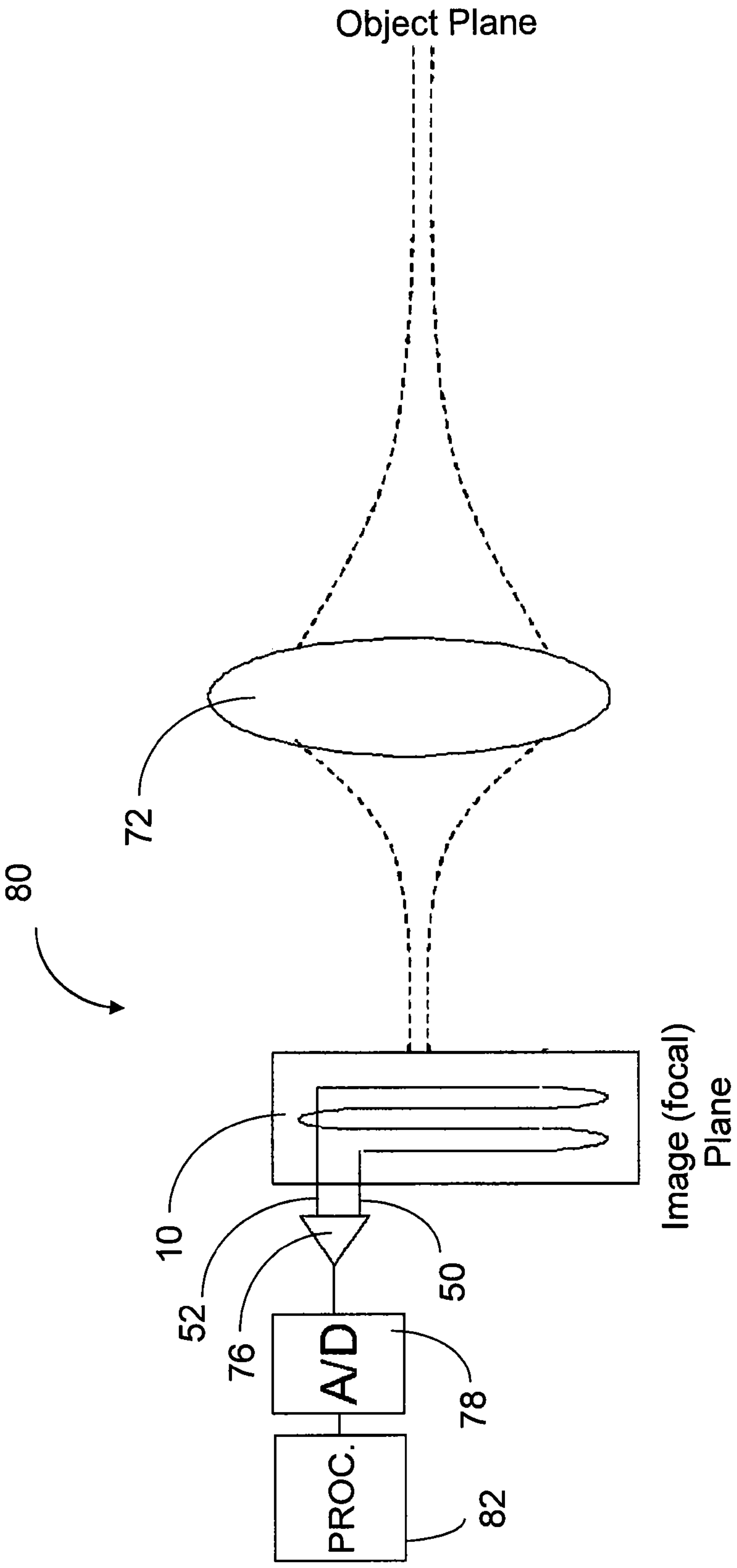
FIG. 2 shows a compressive sensing imaging system in accordance with the present disclosure.

FIG. 2 shows a compressive sensing system 80 in accordance with the present disclosure. The detector array 10, which may be sparsely populated, is placed in the focal plane of imaging optics 72, which focuses the object plane on the focal or imaging plane, so that each detector in the detector array tends to receive energy corresponding to an area in the image plane, so that each detector detects at least one mode. In this way a large number of independent modes, corresponding to independent areas of the scene being imaged, can be simultaneously detected by the detector array 10. Each mode is an energy receiving pattern from the image being sensed.

As described above, the outputs of the detectors in the detector array 10 that have their switches in an open position are summed in series providing a single composite output signal 52, as shown in FIGS. 1 and 2. Output signal 52 and input signal 50, which is the input of the first detector 12 in the detector array 10, may be connected to video amplifier 76. The output of amplifier 76 may be then be converted to digital form by analog to digital converter 78 and processed by processor 82, which may be a digital computer, a microprocessor or a signal processor. Following the techniques of compressive sensing, output voltages are stored in the processor 82 for various patterns of switch states, such that each switch state is a pattern of open and closed switches. Then a set of such measurements is processed to reconstruct the image pattern.

The advantage of the using the detector array 10 versus a single pixel detector for compressive imaging is that there is an increase in the SNR of the generated image. As noted above, the resolution of an image is diffraction limited by the optics to be λ/2, which determines the N pixels of possible resolution for an image for a particular wavelength. In compressive imaging M measurements are made of an N pixel resolution image, where $M<N$. Nonlinear optimization techniques are then processed in processor 82 to form an N pixel image from the M measurements.

If a detector is a single mode detector, then there is an attenuation factor of 1/N at the detector. If instead, a multimode detector array, such as detector array 10, is used to make the measurements, the attenuation factor is $N_m/N$, where $N_m$ is the number of discrete detectors summed in the detector array 10. Because there are $N_m$ detectors in the detector array and because the outputs of the detectors that have their corresponding switches open are summed, there is an increase in the signal that is proportional to $N_m$, while the noise has an increase that is proportional to $\sqrt{N_m}$, because the noise is uncorrelated. Therefore there is a net gain in the signal to noise ratio (SNR) of the generated image of $\sqrt{N_m}$ compared to the SNR of the generated image using a single mode detector.

FIG. 3 shows a discrete detector of the detector array 10, such as detector 12, in accordance with the present disclosure. Ideally, the detectors in detector array 10 do not have significant backscatter or energy loss. The detector 12 may have antenna elements 90 and 92, a diode detector 94, and associated impedance matching circuitry including tuning inductor 96 and RF bypass capacitor 98, which may be located a distance of λ/4 from the detector 94. The λ/4 electrical distance may be achieved with a line arranged in a serpentine pattern. An analog switch, such as switch 13, operating at the video band (i.e., not RF (radio frequency), is connected across each detector. When switch 13 is open the detector output voltage is added to the other detectors in the serially connect detector array 10, as shown in FIG. 1. When the switch 13 is closed the detector voltage for detector 12 is effectively shorted out and does not contribute to the summed composite voltage.

From the foregoing, a method of compressive sensing of energy may include summing the outputs of the plurality of detectors to form a plurality of composite sums, wherein each composite sum corresponds to a switch state. Then the M composite sum measurements made for M different switch states are processed, where M is less than N and the sensed energy is from an image having N pixel resolution. The detectors may be connected serially and the number of detectors in the plurality of detectors may be less than or equal to N. The plurality of detectors may be arranged in an array with horizontal and vertical spacing of λ/2 to a maximum of 10λ between detectors. The plurality of detectors may also be arranged in an array with a random spacing between detectors. As discussed above with reference to FIG. 5, the detector outputs may be directly summed or groups of serially connected detectors may be summed.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A compressive sensor for sensing energy comprising:

a plurality of serially coupled detectors for detecting a plurality of electromagnetic modes, wherein each detector has an input and an output and detects at least one electromagnetic mode of the energy;

a plurality of switches, each respective switch connected between the input of a respective detector and the output of a respective detector, wherein the output of the respective detector is coupled to an input of a following serially coupled detector when the switch is open, and wherein the input of the respective detector is coupled to the input of the following serially coupled detector when the switch is closed;

wherein energy detected by each respective detector having an open switch is added by each following serially coupled detector having an open switch to produce a sum of energy detected by all detectors having an open switch.

2. The compressive sensor of claim 1 wherein groups of the plurality of detectors are serially connected and outputs of the groups of serially connected detectors are coupled a summer.

3. The compressive sensor of claim 1 wherein:

the sensed energy is from an image having N pixels; and a number of detectors in the plurality of detectors is less than or equal to N.

4. The compressive sensor of claim 1 wherein the plurality of detectors are arranged in an array with a spacing of λ/2 to a maximum of 10λ between detectors.

5. The compressive sensor of claim 1 wherein the plurality of detectors are arranged in an array with a random spacing between detectors.

6. The compressive sensor of claim 1 further comprising:

imaging optics for focusing energy onto the plurality of detectors, the focused energy having a resolution of N pixels;

an analog to digital converter for converting the sum of energy to digital; and a processor for processing M sums of energy made for M different switch states, wherein M is less than N; and wherein each switch state is a pattern of the plurality of detectors having open and closed switches.

7. The compressive sensor of claim 1 wherein each detector is a millimeter wave detector.

8. A compressive sensor for sensing energy comprising:

a plurality of detectors for detecting a plurality of electromagnetic modes, wherein the plurality of detectors are connected serially, wherein each detector detects at least one electromagnetic mode of the energy and has an input and an output; and a plurality of switches, each respective switch coupled to between an input and an output of a respective detector, wherein the respective switch may be switched so that the respective detector is bypassed;

wherein energy detected by each respective detector not bypassed is added to energy detected by each following not bypassed serially coupled detector to produce a sum of energy detected by all detectors not bypassed from the plurality of serially connected detectors; and a processor for processing M sums of energy made for M different switch states, wherein M is less than N; and wherein each switch state is a pattern of the plurality of detectors being bypassed and not bypassed.

9. The compressive sensor of claim 8 wherein:

the sensed energy is from an image having N pixel resolution; and a number of detectors in the plurality of detectors is less than or equal to N.

10. The compressive sensor of claim 8 wherein the plurality of detectors are arranged in an array with a spacing of λ/2 to a maximum of 10λ between detectors.

11. The compressive sensor of claim 8 wherein the plurality of detectors are arranged in an array with a random spacing between detectors.

12. The compressive sensor of claim 8 further comprising:

imaging optics for focusing energy onto the plurality of detectors, the focused energy having a resolution of N pixels; and an analog to digital converter for converting the sum of energy to digital.

13. The compressive sensor of claim 8 wherein each detector is a millimeter wave detector.

14. A method of compressive sensing of energy comprising:

coupling in series a plurality of serially coupled detectors for detecting a plurality of electromagnetic modes, wherein each detector has an input and an output and detects at least one electromagnetic mode of the energy;

operating a plurality of switches, each respective switch connected between the input of a respective detector and the output of a respective detector, wherein the output of the respective detector is coupled to an input of a following serially coupled detector when the switch is open, and wherein the input of the respective detector is coupled to the input of the following serially coupled detector when the switch is closed;

adding energy detected by each respective detector having an open switch to each following serially coupled detector having an open switch to produce a sum of energy detected by all detectors having an open switch;

processing M sums of energy made for M different switch states, wherein M is less than N and the sensed energy is from an image having N pixel resolution wherein each switch state is a pattern of the plurality of detectors having open and closed switches;

wherein the step of processing is performed by a processor, a microprocessor, a digital computer, or a signal processor.

15. The method of claim 14 wherein:

a number of detectors in the plurality of detectors is less than or equal to N.

16. The method of claim 14 wherein the plurality of detectors are arranged in an array with a spacing of $\lambda/2$ to a maximum of $10\lambda$ between detectors, or wherein the plurality of detectors are arranged in an array with a random spacing between detectors.

17. The method of claim 14 wherein each detector is a millimeter wave detector.

* * * * *